Oct. 12, 1937.　　O. WITTEL　　2,095,850
MOTION PICTURE APPARATUS OF THE MAGAZINE TYPE
Filed April 24, 1936
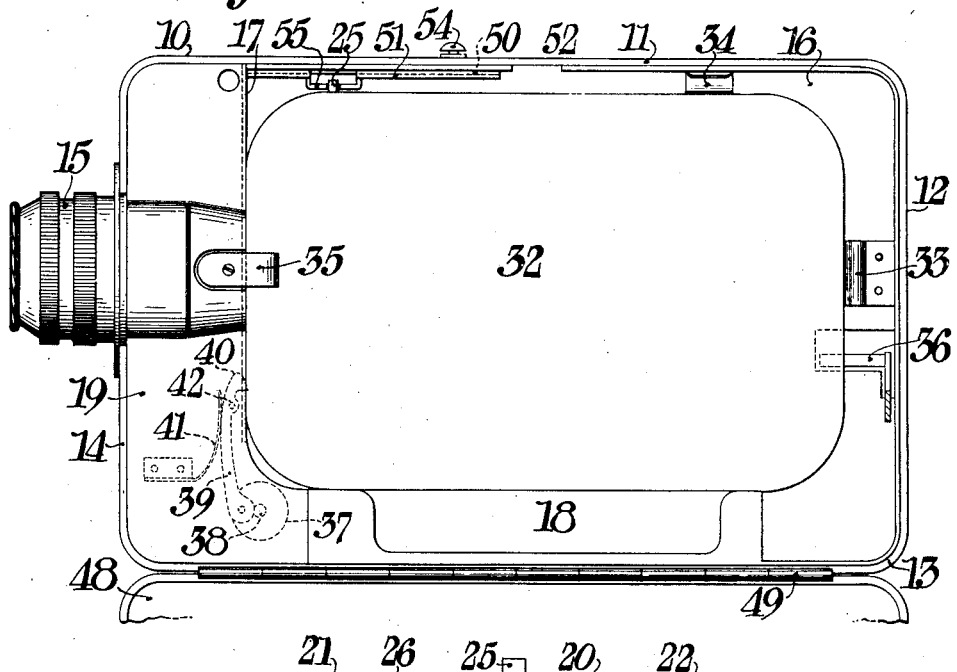
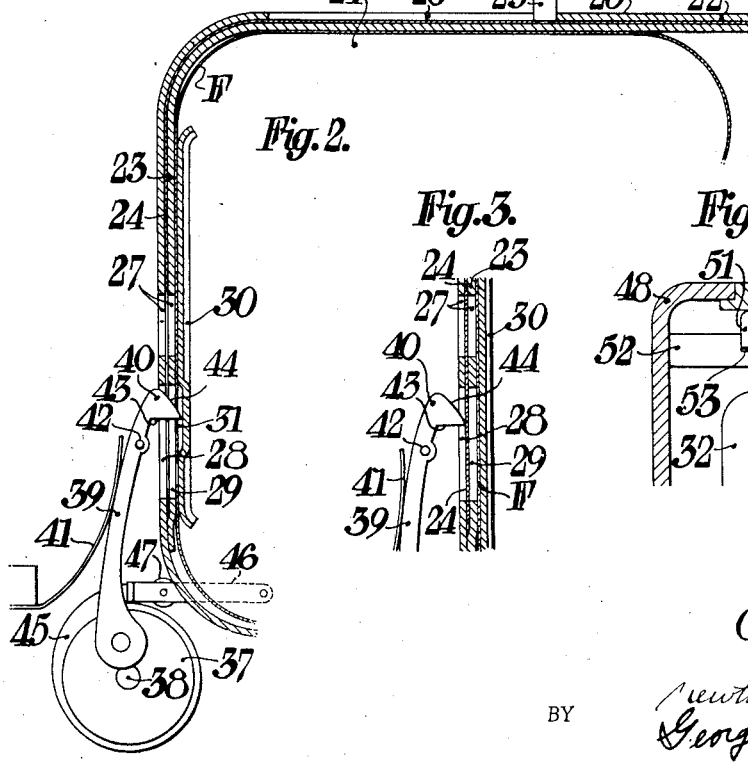
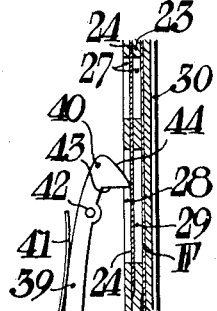
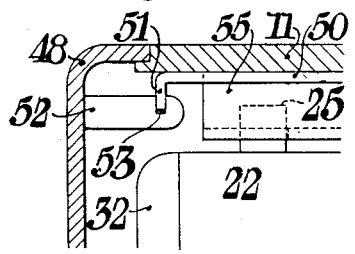
Otto Wittel,
INVENTOR:
BY Newton M Ferris
George A. Gillette Jr.
ATTORNEYS.

Patented Oct. 12, 1937

2,095,850

UNITED STATES PATENT OFFICE 2,095,850

MOTION PICTURE APPARATUS OF THE MAGAZINE TYPE

Otto Wittel, Rochester, N. Y., assignor, by mesne assignments, to Eastman Kodak Company, Jersey City, N. J., a corporation of New Jersey Application April 24, 1936, Serial No. 76,172
In Great Britain February 5, 1936

7 Claims. (Cl. 88—18.4)

The present invention relates to the removal of film magazines from motion picture apparatus of the magazine type and more particularly to an arrangement whereby the closure means for light-sealing the film magazine at the same time moves the film claw out of engagement with the film strip within the magazine.

It has long been recognized that the film advancing mechanism may be located so as to extend into a film magazine for movement of the film therein. Such arrangement, however, generally limits the design of the apparatus by compelling rearward movement of the magazine from the engaging means for removal from the apparatus.

The primary object of the present invention is the provision of a closure means on a film magazine for removing the film claw from the film perforations during movement of the closure means to closed position so that the film magazine may be removed in a lateral direction from the apparatus.

Other and further objects of the invention will be suggested to those skilled in the art by the description which follows.

The above and other objects of the invention are embodied in a motion picture apparatus of the magazine type including a film advancing means having a claw which is resiliently urged into engagement with the film strip within the magazine in combination with a film magazine having a closure means for covering the opening therein and for engaging the claw of the film advancing means to move the same out of engagement with the perforated film strip in the magazine during movement of the closure means to closed position.

Reference is hereby made to the accompanying drawing wherein like reference characters designate similar elements and wherein:

Fig. 1 is a side elevation of a motion picture apparatus of the magazine type.

Fig. 2 is a fragmentary cross-section through a portion of the film magazine and illustrating the film advancing mechanism according to the invention.

Fig. 3 is also a fragmentary cross-section through the front wall of the magazine.

Fig. 4 is a fragmentary transverse cross-section through the motion picture apparatus and illustrating the latching means for the cover thereof.

The invention herein disclosed may be applied to all kinds of motion picture apparatus of the magazine type but for purposes of illustration only is shown and described as applied to a motion picture camera.

Said motion picture camera comprises a casing 10 having an upper edge wall 11, a rear edge wall 12, a bottom edge wall 13 and a front edge wall 14. An objective 15 is attached to the front edge wall of the casing 10.

Said casing 10 is provided with a magazine chamber which is formed by a mechanism plate 16, a front plate 17, a supporting member 18, the upper edge wall 11 and rear edge wall 12. A cover plate 19 encloses a mechanism chamber in the forward end of casing 10.

The film magazine, see Fig. 2, comprises a casing 20 with a side wall 21 and an edge wall 22 extending around the edge of side wall 21. An auxiliary wall 23 is attached to edge wall 22 and extends along the front and upper portions thereof, being spaced a slight distance from edge wall 22. A flexible shutter 24 is slidably positioned between edge wall 22 and auxiliary wall 23, being operated by a pin 25 which extends through a slot 26 in the upper portion of edge wall 22. The front portions of edge wall 22 and auxiliary wall 23 are each provided with exposure apertures 27, while edge wall 22 is provided with a claw slot 28 and auxiliary wall 23 is provided with a claw slot 29 in registry with said claw slot 28. The film F is held in position across the inner exposure aperture 27 and across the claw slot 29 by a presser pad 30 which is provided with a depression 31 opposite the claw slot 29. A cover 32 fits over the margins of magazine casing 20 to enclose the same.

The film magazine is positioned within said magazine chamber by means of a plurality of spring members, spring member 33 bears on the rear edge of magazine casing 20 to press the forward portion of edge wall 22 against the front plate 17 of the camera casing, a spring member 34 bears on the upper edge of magazine casing 20 to press its lower edge against supporting member 18, and a spring member 35 overlaps the magazine chamber and a portion of the cover 32 for the magazine casing to press the side wall 21 of said casing 20 against the mechanism plate 16 within the camera casing. As a result the film magazine is accurately positioned within the magazine chamber and may be removed from said chamber by an ejector mechanism 36 which is fully disclosed in my copending application, Serial No. 1,372, filed January 11, 1935, for Improvements in ejector for motion picture apparatus of the magazine type.

The film advancing means may be of any conventional form which includes a claw which is resiliently urged into engagement with a perforated film strip. For example, such film advancing means may comprise a driving disc 37 mounted upon a shaft 38, a claw arm 39 eccentrically pivoted on driving disc 37 and carrying a claw 40, and a spring 41 bearing on the rear edge of claw arm 39 to urge claw 40 into engagement with the film strip. The claw arm 39 also carries a transverse pin 42 which may strike against the camera front plate 17 when the film magazine is removed from the camera so that the claw arm 39 cannot enter the magazine chamber to any substantial distance under the action of spring 41. The claw 40 has a film-engaging edge 43 and a cam surface 44.

A single toothed cam 45 is also mounted on shaft 38 and may be blocked by a lever 46 which carries a button 47. Said cam 45 and lever 46 constitute the release mechanism for the camera which is of conventional construction.

A cover 48 is connected to the bottom edge wall 13 of camera casing 10 by a hinge 49. In open position of cover 48, as shown in Fig. 1, the magazine chamber is open at one side for ready insertion or removal of the film magazine. Said cover 48 is held in a closed position, as indicated in Fig. 4, by a latching means now to be described. Said latching means comprises a latching bar 50 slidably mounted on upper edge wall 11 of camera casing 10 and having a lateral flange 51. A post 52 is mounted on cover 48 and provided with a slot 53 which in locking position of latching bar 50 is engaged by the lateral flange 51. A finger button 54 is fastened to latching bar 50 and extends to the exterior of camera casing 10. A saddle piece 55 is also mounted on latching bar 50 and receives the pin 25 on the flexible shutter 24 of the film magazine. Hence after closing camera cover 48 and operation of finger 54 toward the right of Fig. 1, the latching bar 50 is moved so that lateral flange 51 engages the slot 53 in post 52 to fasten the cover in closed position and at the same time saddle piece 55 moves the pin 25 to the right so that flexible shutter 24 is moved to the open position shown in Fig. 2. The magazine camera is now in condition for operation.

After completion of the camera run, the problem of removing the film magazine without fogging the film therein and without interference by the film advancing means is presented. According to the invention movement of the latching means to open position by shifting the latching bar 50 to the left moves the saddle piece and pin 25 to the left and lowers the flexible shutter 24 to cover the exposure apertures 27 and the claw slots 28 and 29. The cam surface 44 on claw 40 is engaged by the flexible shutter 24 so that the claw 40 and claw arm 39 are removed from the claw slot 29 and from engagement with the perforations in film F. The flexible shutter then moves past claw 40 to complete the closure of claw slots 28 and 29 to the position shown in Fig. 3. Obviously, the removal of the film magazine would be very difficult without first repelling the claw 40 from engagement with the film and from one of the claw slots. Furthermore, unless such closure of the claw slot is effected, several frames of the film adjacent that slot will become fogged.

Since the closure means for the openings and slots in the magazine may be provided in many different forms and since the film advancing means including a spring pressed claw may assume any one of the many known constructions, the present disclosure is to be considered in an illustrative sense and limited only by the following claims.

Having now particularly described my invention what I desire to secure by Letters Patent of the United States and what I claim is:

1. In a photographic apparatus, the combination with a magazine casing adapted to contain a perforated film strip and provided with an opening, and a film advancing means including a claw member having a cam surface and film engaging member which is resiliently urged into said opening to engage said perforated film strip, of a closure means for covering the opening in said casing and for engaging said cam surface to move said film engaging member out of engagement with said perforated film strip.

2. In a photographic apparatus, the combination with a magazine casing adapted to contain a perforated film strip and provided with an opening, and a film advancing means including a claw member having a cam surface and film engaging member which is resiliently urged into said opening to engage said perforated film strip, of a closure means on said casing for covering the opening therein and for engaging said cam surface to move said film engaging member out of engagement with said perforated film strip.

3. In a motion picture apparatus, the combination with a magazine casing adapted to contain a perforated film strip and provided with an opening, and a film advancing means including a claw having a cam surface and resiliently urged into said opening to engage said perforated film strip, of a closure means on said casing for covering said opening therein, for engaging the cam surface on said claw, and adapted upon movement of said closure means to move said claw out of engagement with said perforated film strip.

4. In a motion picture apparatus, the combination with a magazine casing adapted to contain a perforated film strip and provided with an opening, and a film advancing means including a claw with a cam surface and including a resilient means for resiliently urging said claw into said opening to engage said perforated film strip, of a closure means on said casing, movable into a closed position and an open position with respect to said opening, and for engaging the cam surface on said claw to move the same out of engagement with said perforated film strip during movement of said closure means to closed position.

5. In a motion picture apparatus, the combination with a magazine casing provided with an opening and adapted to contain a perforated film strip, and a film advancing means including a claw with a cam surface and including a resilient means for resiliently urging said claw into said opening to engage said perforated film strip, of a closure means slidably mounted on said casing, movable into a closed position and an open position with respect to said opening, and for engaging the cam surface on said claw to move the same out of engagement with said perforated film strip during sliding movement of said closure means to said closed position.

6. In a motion picture apparatus, the combination with a magazine casing adapted to contain a perforated film strip, provided with an exposure opening through which the film in the casing may be exposed, and provided with a claw slot, and a film advancing mechanism including a claw with a cam surface and including a resilient means for resiliently urging said claw into said claw slot to engage said perforated film strip, of a closure means on said casing, movable into a closed position and an open position with respect to said exposure opening and said claw slot, and for engaging the cam surface on said claw to move the same out of engagement with said perforated film strip during movement of said closure means to said closed position.

7. In a motion picture camera, the combination with a camera casing provided with a magazine chamber, a cover for enclosing said magazine chamber, a magazine casing provided with an opening and adapted to contain a perforated film strip and to be positioned within said magazine chamber, and a film advancing mechanism including a claw with a cam surface and including a resilient means for resiliently urging said claw into said opening to engage said perforated film strip, of a latching means between said cover and said camera casing, movable to a locking position to fasten said cover to said camera casing, and movable to an unlocking position to permit said cover to be opened, and a closure means on said magazine casing, movable into a closed position and into an open position with respect to said opening in the magazine casing, adapted to be connected to said latching means and for engaging the cam surface on said claw to move the same out of engagement with said perforated film strip upon movement of said latching means to unlocking position and said closure means to closed position.

OTTO WITTEL.